US012633160B2

(12) United States Patent
Huang et al.

(10) Patent No.: US 12,633,160 B2
(45) Date of Patent: May 19, 2026

(54) FACE REGION DETECTION AND LOCAL RESHAPING ENHANCEMENT

(71) Applicant: Dolby Laboratories Licensing Corporation, San Francisco, CA (US)

(72) Inventors: Tsung-Wei Huang, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 283 days.

(21) Appl. No.: 18/290,700

(22) PCT Filed: Jul. 25, 2022

(86) PCT No.: PCT/US2022/038249
§ 371 (c)(1),
(2) Date: Jan. 19, 2024

(87) PCT Pub. No.: WO2023/009469
PCT Pub. Date: Feb. 2, 2023

(65) Prior Publication Data
US 2024/0428612 A1     Dec. 26, 2024

Related U.S. Application Data

(60) Provisional application No. 63/226,938, filed on Jul. 29, 2021.

(30) Foreign Application Priority Data

Jul. 29, 2021     (EP) ..................................... 21188517

(51) Int. Cl.
*G06V 40/16*          (2022.01)
*G06T 5/20*           (2006.01)
(Continued)

(52) U.S. Cl.
CPC .............. *G06V 40/162* (2022.01); *G06T 5/20* (2013.01); *G06T 5/40* (2013.01); *G06T 5/94* (2024.01);
(Continued)

(58) Field of Classification Search
None
See application file for complete search history.

(56) References Cited

U.S. PATENT DOCUMENTS 10,628,700 B2     4/2020   Puri
2003/0223622 A1   12/2003  Simon
(Continued)

FOREIGN PATENT DOCUMENTS

JP      2011090569 A     5/2011
WO      2022072884 A1    4/2022
WO      2022260907 A1    12/2022

OTHER PUBLICATIONS

Birgitta Tinkauppi: "Face Colour Under Varying Illumination—Analysis and Applications" Aug. 30, 2002 (Aug. 30, 2002), XP055480928, ISBN: 978-951-42-6788-8; vol. 171; Section 6; figures 27, 35. 117 pages.
(Continued)

*Primary Examiner* — Leon Flores

(57) ABSTRACT

Methods and corresponding systems to process face regions are disclosed. The described methods include providing face bounding boxes and confidence levels for the faces, generating a histogram of the pixels and the faces, generating a probability of face, and generating a face probability map. A face contrast adjustment and a face saturation adjustment can be applied to the face probability map.

19 Claims, 8 Drawing Sheets

(51) Int. Cl.
G06T 5/40 (2006.01)
G06T 5/94 (2024.01)
G06V 10/34 (2022.01)

(52) U.S. Cl.
CPC .... G06V 10/34 (2022.01); G06T 2207/10016 (2013.01); G06T 2207/30201 (2013.01)

(56) References Cited

U.S. PATENT DOCUMENTS

| | | | |
|---|---|---|---|
| 2014/0010448 A1 | 1/2014 | Lischinski | |
| 2014/0112553 A1* | 4/2014 | Yamaguchi | G06V 40/172 382/118 |
| 2015/0003727 A1 | 1/2015 | Carpenter | |
| 2017/0076142 A1* | 3/2017 | Chang | G06T 7/11 |
| 2017/0339417 A1 | 11/2017 | Puri | |
| 2019/0014884 A1 | 1/2019 | Fu | |
| 2019/0122404 A1 | 4/2019 | Freeman | |

| | | | |
|---|---|---|---|
| 2019/0318158 A1 | 10/2019 | Qin | |
| 2020/0311386 A1* | 10/2020 | Velusamy | G06T 5/10 |

OTHER PUBLICATIONS

He, Kaiming, Jian Sun, and Xiaoou Tang. "Guided image filtering." IEEE transactions on pattern analysis and machine intelligence 35, No. 6 (2012): 1397-1409. 13 pages.

Soriano Met Al: "Adaptive skin color modeling using the skin locus for selecting training pixels", Pattern Recognition, Elsevier, GB, vol. 36, No. 3, Mar. 1, 2003 (Mar. 1, 2003), pp. 681-690, XP004393099, ISSN: 0031-3203, DOI: 10.1016/S0031-3203(02)00089-4 Section 2; figures 2,9. 5 pages.

Wells, William M. "Efficient synthesis of Gaussian filters by cascaded uniform filters." IEEE Transactions on Pattern Analysis and Machine Intelligence 2 (1986): 234-239. 6 pages.

Zhang, Shifeng, Xiangyu Zhu, Zhen Lei, Hailin Shi, Xiaobo Wang, and Stan Z. Li. "Faceboxes: A CPU real-time face detector with high accuracy." In 2017 IEEE International Joint Conference on Biometrics (IJCB), pp. 1-9. IEEE, 2017. 9 pages.

\* cited by examiner

51

INPUT IMAGE

50

FACE BOUNDING
BOXES

52

BASIC FACE
SHAPE

53   TRIMMING

54   INDIVIDUAL
HISTOGRAMS
OF EACH FACE

61

GENERIC
HISTOGRAM
OF ALL PIXELS

62

GENERIC
HISTOGRAM
OF FACE

GAUSSIAN
FILTERING

GAUSSIAN
FILTERING

63

63

./

64

65   SCALING AND
THRESHOLDING

66   INITIAL
PROBABILITY
OF FACE

67

−

GENERIC HISTOGRAM
OF NON-FACE   68

FACE REGION DETECTION AND LOCAL RESHAPING ENHANCEMENT

CROSS-REFERENCE TO RELATED APPLICATIONS

This application is a U.S. National Stage application under U.S.C. 371 of International Application No. PCT/US2022/038249, filed on Jul. 25, 2022, which claims the benefit of priority from U.S. Provisional patent application Ser. No. 63/226,938, filed on 29 Jul. 2021, and EP Application Serial No. 21188517.3, filed on 29 Jul. 2021, which are hereby incorporated by reference.

TECHNICAL FIELD

The present disclosure relates in general to video image processing. In particular, this disclosure relates to face region detection and local reshaping enhancement.

BACKGROUND

Face detection methods have been used in various applications that identify human faces in images and/or videos. In some of the existing face region detection methods, the face region can be detected by skin tone. Some methods based on graph-cut or graphical models may use the bounding boxes of faces to predict segmentation of faces in images. Based on recently developed techniques, deep convolutional neural networks for semantic and instance segmentation tasks can be used for face region detection.

SUMMARY

The disclosed methods and devices provide an efficient framework to detect face region in images given bounding boxes of faces and apply different adjustment on the face region in local reshaping. The detection of face region is based on histogram analysis of the face and can be efficiently extended to continuous frames in video clips. When applying the detected face region to local reshaping, the contrast and saturation of faces can be adjusted separately from other image contents to avoid over-enhancement of details, such as wrinkles or spots, on faces.

An embodiment of the present invention is a method of face region detection in an input image including one or more faces, the method comprising: providing face bounding boxes and confidence levels for each face of the one or more faces; based on the input image, generating a histogram of all pixels; based on the input image and the face bounding boxes, generating histograms of the one or more faces; based on the histogram of all pixels and the histograms of the one more face, generating a probability of face, and based on the probability of face, generating a face probability map. Another embodiment of the present invention utilizes the face region detection of the previous embodiment to apply local reshaping by applying face saturation adjustment and face contrast adjustment to the face probability map to generate an adjusted face probability map; and generating a reshaped image based on the adjusted face probability map and one or more selected reshaping function.

A method may be computer-implemented in some embodiments. For example, the method may be implemented, at least in part, via a control system comprising one or more processors and one or more non-transitory storage media.

Some or all of the methods described herein may be performed by one or more devices according to instructions (e.g. software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces. The control system may include at least one of a general-purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to one or more processors.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

BRIEF DESCRIPTION OF DRAWINGS

FIG. 8A shows an exemplary graph of probability of face and FIG. 8B shows an exemplary histogram of non-face according to an embodiment of the present disclosure. FIG. 8C shows an exemplary histogram of truly non-face and FIG. 8D shows an exemplary graph of updated probability of non-face according to an embodiment of the present disclosure.

DETAILED DESCRIPTION

The previous methods of facial recognition for image processing have drawbacks for video. For example, skin tone detection cannot be generalized well, because skin tone varies between different people and different lighting conditions. Predicting segmentation is computationally expensive for video. And neural networks can create flickering artifacts in further operations due to missing detections and temporal inconsistency. The systems and methods provided herein avoid those deficiencies.

As used herein, "face bounding box" refers to an imaginary (non-drawn) rectangle that serves as a point of reference for a face detected by a face detection algorithm.

As used herein, "histogram of a face" refers to grouped data for a detected face image.

As used herein, "face probability map" refers to a pixel mapping of an image to the probabilities of each pixel individually being part of a face.

As used herein, "basic face shape" or "basic face shape model" refers to a shape (e.g. an ellipse) that represents generally the size and shape of a detected face and a "basic face shape map" refers to a pixel mapping of basic face shapes in an image.

As used herein, "probability of face" and "probability of non-face" refer to the calculated probability of a pixel being in a face or not in a face respectively.

As used herein, "soft morphological operation" refers to non-linear operations related to the shape or morphology of features in an image where the maximum and the minimum operations used in standard gray-scale morphology are replaced by weighted order statistics.

As used herein, "face adjustment" refers to applying reshaping operations on the detected face regions of an image.

Figures 1, 3:
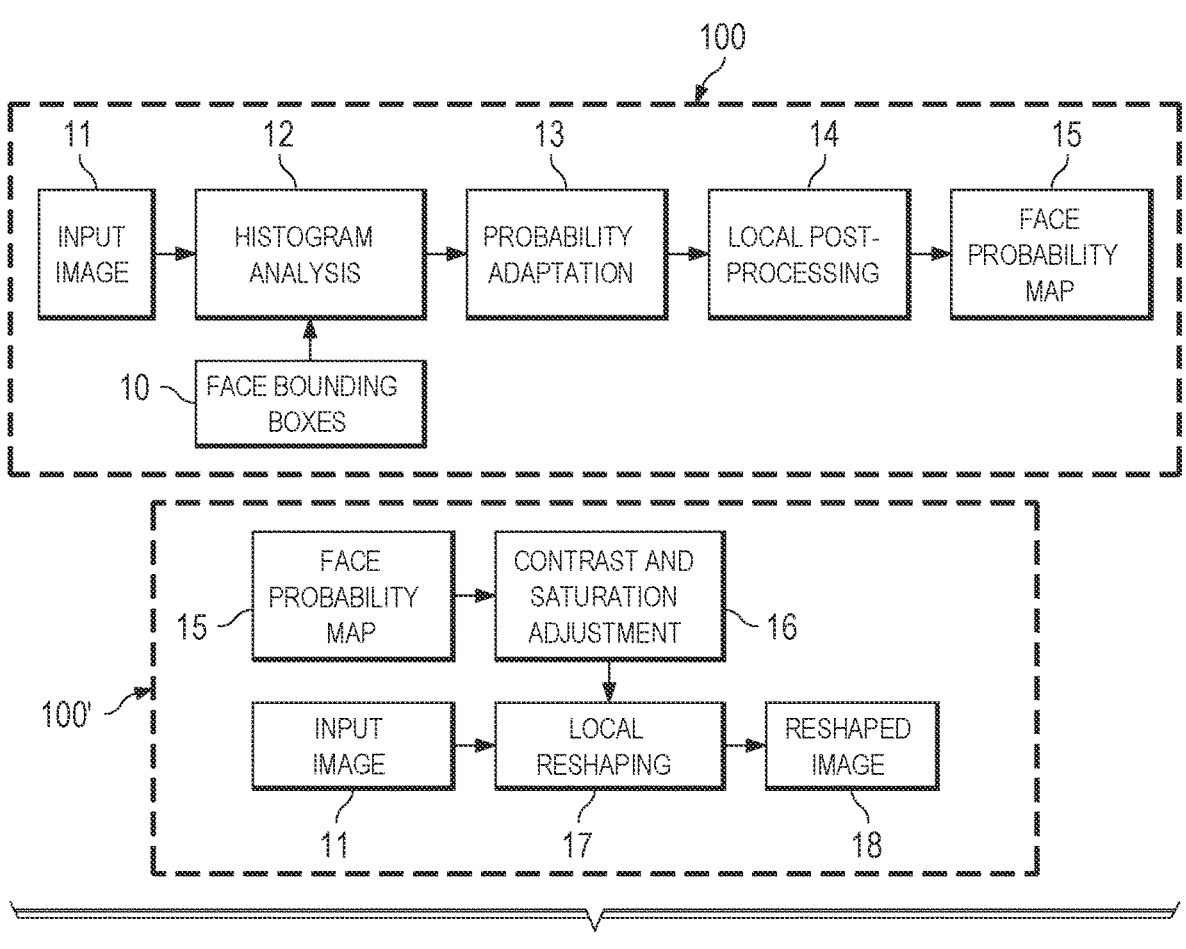
FIG. 1 shows an exemplary diagram of the face region detection and local reshaping with face adjustment according to an embodiment of the present disclosure.
FIG. 3 shows an exemplary diagram of generating global generic histograms according to an embodiment of the present disclosure.

As shown in the exemplary embodiment of FIG. 1, the disclosed method comprises face region detection (100). Given an input image (11) and pre-detected face bounding boxes (10), the histogram (12) properties are analyzed and the probability (13) of face is predicted for each bin in the histogram. Local post-processing (14) is then applied, and as a result, smoothness is improved and small noise in the generated face probability map (15) is removed.

Local reshaping (100') processing can then be applied. With the face probability map (15), different local reshaping (17) operations on face region are applied. The contrast and saturation in face region are adjusted (16) so that it looks natural and visually pleasant in the reshaped image (18). In an embodiment, local reshaping methods like those proposed in U.S. Prov. App. Ser. 63/086,699 filed by the applicant of the present disclosure, for "Adaptive Local Reshaping For SDR-To-HDR Up-Conversion" filed on Oct. 2, 2020 and incorporated herein by reference in its entirety, can be used. In this method, the contrast and saturation for each pixel can be easily adjusted.

Figure 2:
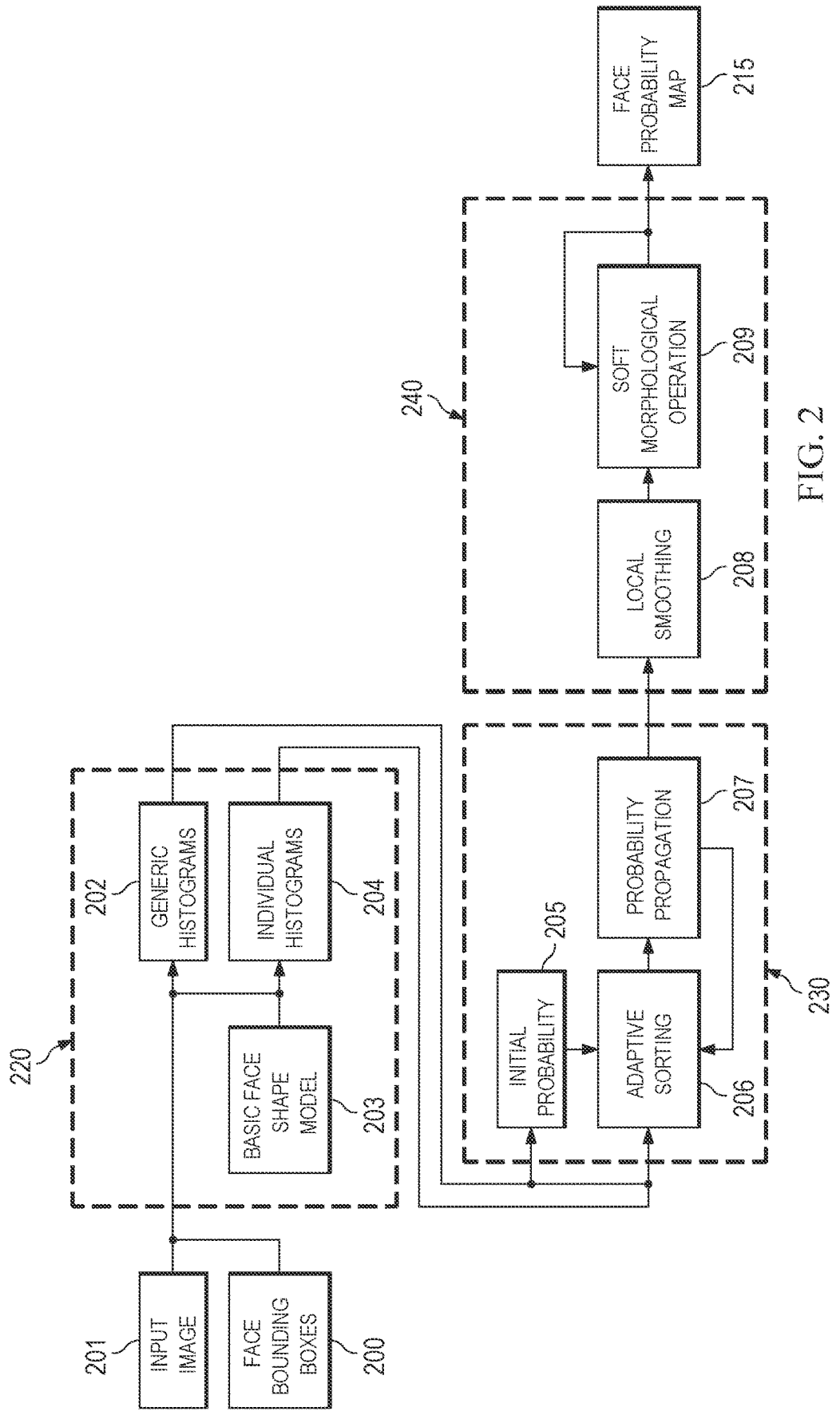
FIG. 2 shows an exemplary diagram of the face region detection process according to an embodiment of the present disclosure.

With continued reference to FIG. 1, the disclosed methods may also be integrated with existing linear encoding architecture for local reshaping (see e.g. U.S. Prov. App. Ser. 63/086,699 mentioned above) to address the real-world conversion scenario. The presented methods take advantage of the sliding window in linear encoding architecture to enhance the temporal stability in final video quality A. Face Region Detection FIG. 2 shows an exemplary diagram of the face region detection process according to an embodiment of the present disclosure. Given that the colors of faces are most likely different from the colors of other contents in the same image, such process is based on analyzing the histograms of face in YUV color space. Given an input image (201) and pre-detected bounding boxes of faces (200), as shown in histogram analysis step (220), the generic histograms (202) of face and all pixels and the individual histograms (204) of each detected face in YUV color space are first calculated. A basic face shape model (203) is used to generate the basic shape map, which is an initial guess of face region in the input image (201) for calculating the histograms. As part of step (230), the initial probability (205) of face in YUV color space is calculated from the generic histograms (202). Adaptive sorting (206) may then be used to refine the initial probability of face based on the individual histograms (204) of each face and the generic histograms (202). The probability of face then is iteratively updated and propagated (207) in YUV color space.

With further reference to FIG. 2, as shown in local post-processing step (240), given the refined probability of face, local smoothing (208) is first performed to avoid artifact due to abrupt probability changes in image. This is followed by iterative application of soft morphological operation (209) to remove small noise from the final face probability map (215) of the input image (201). The pre-detected bounding boxes (200) of faces may be from any kinds of face detectors that predict the bounding boxes and corresponding detection scores of faces. In what follows, details of various steps shown in the embodiment of FIG. 2 will be described.

A.1 Histogram Analysis

According to the teachings of the present disclosure, as part of the histogram analysis, a face shape model is used to generate the initial guess of face region for calculating the generic histogram of face. In order to capture the diversity of colors in different faces in the same image, the individual histogram of each face is also calculated.

A.1.1 Global Generic Histograms

FIG. 3 shows an exemplary diagram of generating global generic histograms according to an embodiment of the present disclosure. The generic histograms refer to the histogram of all faces or the histogram of all pixels. To calculate the generic histogram of face in the input image (31), the region of face is defined first. Based on the already detected bounding boxes (30) of faces, each of them may be filled with the average shape of face, i.e. basic face shape (32), to get an initial guess of face region. Given an input image (31), S, of size W×H and $N_{face}$ detected faces with bounding boxes $(c_k, x_k, y_k, w_k, h_k)$, $k=0, \ldots, N_{face}-1$, where $c_k$ is the detection score between 0 and 1, $(x_k, y_k)$ is the coordinate (either in integer or floating point) of the top-left corner of the bounding box, and $(w_k, h_k)$ is the size (either in integer or floating point) of the bounding box of the k-th detected face, a basic shape map (33), $M_Q$, can be generated. Such basic shape map is the initial guess of face region, using the pre-defined or pre-trained basic face shape (32) model, denoted as Q. The basic face shape (32) model is the probability map of face inside the detected bounding box. It can also be viewed as the average shape of face. As an example, a basic face shape (32) model, Q, can be a solid inscribed ellipse of the bounding box, i.e. 1 inside the ellipse and 0 outside the ellipse. As another example, the basic face shape (32) model can also be learned from training data of segmentation of faces. In general, a basic face shape (32) model can be saved as a probability map of size $W_Q \times H_Q$ and resized for each detected face.

Figure 4:
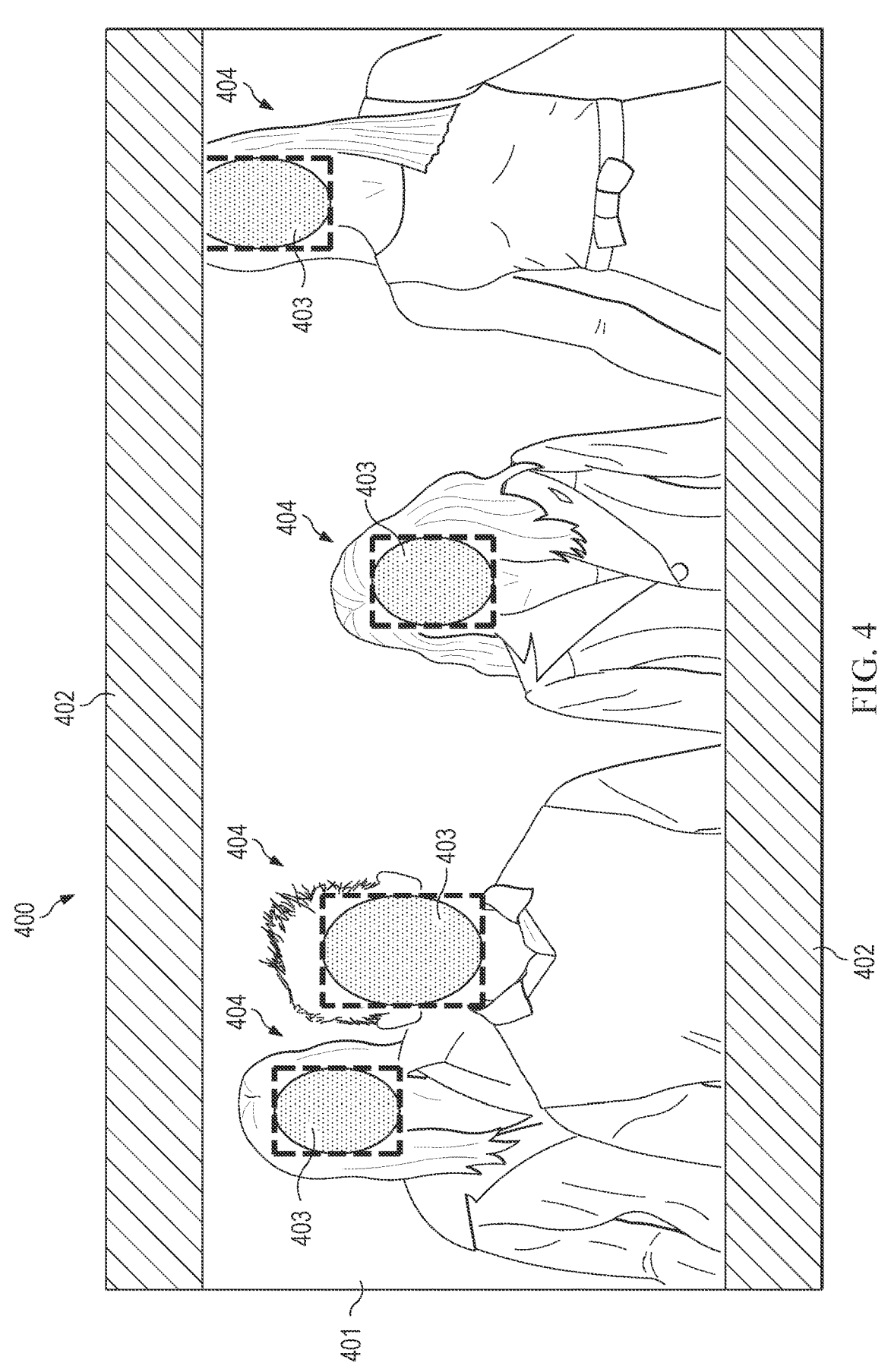
FIG. 4 shows an image with detected faces according to an embodiment of the present disclosure.

With further reference to FIG. 3, for the k-th detected face, the face shape model may be resized and shifted to fit it into the bounding box (30) to obtain the probability map of face $M_{Q,k}$. Then the probability map is multiplied by the detection score $c_k$ to reduce the effect from false positive detections, which usually have lower detection scores. Then, the probability maps of all detected faces are added to the basic shape map (33), $M_Q$. The maximum value of $M_Q$ may be clipped to 1 in case there are overlapping bounding boxes. If there are any letterboxes in $M_Q$, such letterboxed are excluded. Given the probability map of non-active region (padded black areas with arbitrary shapes, such as letterboxes, pillar boxes, circles, or any other shapes) $M_L$ obtained from a non-active region detector such as the one described in U.S. Prov. App. Ser. 63/209,602 filed by the applicant of the present disclosure, for "Surround Area Detection And Blending For Image Filtering" filed on Jun. 11, 2021 and incorporated herein by reference in its entirety, the probability map of region of interest (ROI) can be defined as $M_{ROI} = 1 - M_L$ and then multiplied by $M_Q$. Therefore, the final $M_Q$ can be formulated as:

$$M_Q = M_{ROI} . * \left(\min\left(\sum_k c_k M_{Q,k}, 1\right)\right) \qquad (1)$$

where operator .* is element-wise multiplication. In order to further clarify the above-disclosed teachings, reference is made to FIG. 4 showing an image (400) wherein four faces have been detected. Image (400) includes image main area (401) and letterbox (402). A basic shape map (403) and a face bounding box (404) associated with the four faces are also shown.

Referring back to FIG. 3, as the bounding boxes (30) from face detector may not always be perfect, the actual face region may be outside the bounding boxes (30). Therefore, the probability of face outside the bounding box may not be 0. In this case, the center and scale of the bounding box may be fixed with scaling factor $f_{box,x}$ and $f_{box,y}$ for x and y directions before fitting the basic face shape model. The pseudocode below shows an example of how the basic shape map is generated from basic face shape model of inscribed ellipse:

```
Generate the basic shape map from basic face shape
model of inscribed ellipse
Input: detected face bounding boxes (c_k, x_k, y_k, w_k, h_k),
k = 0, ... , N_face − 1,
probability map of ROI M_ROI, scaling factors f_box,x, f_box,y
Output: basic shape map M_Q
// Initialization
for (i = 0; i < H; i ++) {
  for(j = 0; j < W; j ++) {
    M_Q(i, j) = 0
  }
}
```

-continued

```
// Add probability of each detected face to map
for (k = 0; k < N_face; k ++) {
  // Skip invalid detection
  if (wk == 0 or h_k == 0 or c_k == 0) {
    continue
  }
  // Center and half of the width and height of the rectangle to fit
  c_x = x_k + w_k/2
  c_y = y_k + h_k/2
  s_x = f_box,x * w_k/2
  s_y = f_box,y * h_k/2
  // Location and size of the rectangle to fit
  x_f = c_x − S_x
  y_f = c_y − S_y
  w_f = 2s_x
  h_f = 2s_y
  // Valid pixel range
  x_begin = max(round(x_f ), 0)
  x_end = min(round (x_f + w_f ), W)
  y_begin = max(round(y_f ), 0)
  y_end = min(round (y_f + h_f ), H)
  // Fill in basic face shape map
  for (i = y_begin; i < y_end; i ++) {
    for (j = x_begin; j < x_end; j ++) {
      // Solid ellipse
      if ((i − c_y)²/(s_y)² + (j − c_x)²/(s_x)² ≤ 1) {
        M_Q(i, j) = M_Q(i, j) + c_k
      }
    }
  }
}
// Clip maximum to 1
M_Q = min(M_Q, 1)
// Apply ROI
M_Q = M_Q.* M_ROI
return M_Q
Generate the basic shape map from basic face shape
model of arbitrary shape
Input: detected face bounding boxes
(c_k, x_k, y_k, w_k, h_k), k = 0, ... , N_face − 1,
probability map of ROI M_ROI, basic face shape model Q, scaling
factors f_box,x, f_box,y
// Initialization
for (i = 0; i < H; i ++) {
  for (j = 0; j < W; j ++) {
    M_Q(i, j) = 0
  }
}
// Add probability of each detected face to map
for (k = 0; k < N_face; k ++) {
  // Skip invalid detection
  if (w_k == 0 or h_k == 0 or c_k == 0) {
    continue
  }
  // Center and half of the width and height of the rectangle to fit
  c_x = x_k + w_k/2
  c_y = y_k + h_k/2
  s_x = f_box,x * w_k/2
  s_y = f_box,y * h_k/2
  // Location and size of the rectangle to fit
  x_f = c_x − s_x
  y_f = c_y − s_y
  w_f = 2s_x
  h_f = 2s_y
  // Valid pixel range
  x_begin = max(round(x_f), 0)
  x_end = min(round(x_f + w_f), W)
  y_begin = max(round(y_f), 0)
  y_end = min(round (y_f + h_f ), H)
  // Fill in basic face shape map
  for (i = y_begin; i < y_end; i ++) {
    for (j = x_begin; j < x_end; j ++) {
      // Coordinate in basic face shape model
      i_m = clip3(round((i − y_f) * H_Q/h_f), 0, H_Q − 1)
      j_m = clip3(round((j − x_f) * W_Q/w_f), 0, W_Q − 1)
      // Add to basic shape map
      M_Q(i, j) = M_Q(i, j) + c_k * Q(i_m, j_m)
    }
  }
}
```

-continued

```
}
// Clip maximum to 1
M_Q = min(M_Q, 1)
// Apply ROI
M_Q = M_Q .* M_{ROI}
return M_Q
```

With continued reference to FIG. 3, given the face region defined in the basic shape map (32), the generic histograms of face (35) and generic histograms of all pixels (34) can be calculated. According to an embodiment of the present disclosure, the generic histogram of face (35) is calculated as weighted counting of pixels, where the weight is from the basic shape map (32). On the other hand, the generic histogram of all pixel (34) is a histogram counting for all pixels in ROI. For computational efficiency, the pixel may be subsampled during counting with a subsample factor $s_{hist}$. As an example, $s_{hist}$ may be set as $s_{hist}=2$. The histograms of the input image (31) of size H×W may be calculated in YUV color space. The YUV channels of the input image are denoted as $S^Y$, $S^U$ and $S^V$, respectively, and the number of bins for each channel as $$N_{bin}^Y, N_{bin}^U \text{ and } N_{bin}^V,$$

respectively. For the input bit depth $B^S$, the bin width for each channel is calculated as $$w_{bin}^Y = 2^{B^S}/N_{bin}^Y, w_{bin}^U = 2^{B^S}/N_{bin}^U \text{ and } w_{bin}^V = 2^{B^S}/N_{bin}^V.$$

Exemplary values for $$B^S, N_{bin}^Y, N_{bin}^U \text{ and } N_{bin}^V, \text{ are } B^S = 10 \text{ and } N_{bin}^Y = N_{bin}^U = N_{bin}^V = 128.$$

For different YUV input formats, the corresponding pixel locations in each channel may be needed. For YUV420 input, the Y channel may be saved as a W×H array and the U and V channels may be saved as $W_{half}$×$H_{half}$ arrays, where $W_{half}$=W/2 and $H_{half}$=H/2. Therefore, $$S_{half}^U \text{ and } S_{half}^V$$

are used to represent the down-sampled U and V channels, respectively. For computation efficiency, the pixel location (i,j) in $S^Y$ may be matched to ($\lceil i/2 \rceil, \lceil j/2 \rceil$) in $$S_{half}^U \text{ and } S_{half}^V.$$

For other YUV format, adjustment may be made accordingly. The following pseudocode is an example of the generic histograms of face and all pixels for YUV420 input is calculated:

```
// Calculate the generic histograms of face and all pixels for YUV420
input
Input: YUV channels of input image S^Y, S_half^U and S_half^V, basic
shape map M_Q, probability map of ROI M_{ROI}, subsample factor S_{hist}
Output: generic histogram of face hist_{face}, generic
histogram of all pixels hist_{all}
// Initialization
hist_{face} = zeros (N_{bin}^Y, N_{bin}^U, N_{bin}^V)
// Weighted count
for (i = 0; i < H; i+= s_{hist}) {
    for (j = 0; j < W; j+= s_{hist}) {
        i_{half} = ⌊i/2⌋ // convert index for YUV420 input
        j_{half} = ⌊j/2⌋ // convert index for YUV420 input
        b^Y = ⌊S^Y(i, j)/w_{bin}^Y⌋
        b^U = ⌊S_half^U(i_{half}, j_{half})/w_{bin}^U⌋
        b^V = ⌊S_half^V(i_{half}, j_{half})/w_{bin}^V⌋
        hist_{face}(b^Y, b^U, b^V) = hist_{face}(b^Y, b^U, b^V) + M_Q(i, j)
        hist_{all}(b^Y, b^U, b^V) = hist_{all}(b^Y, b^U, b^V) + M_{ROI}(i, j)
    }
}
return hist_{face}, hist_{all}
```

A.1.2 Local Individual Histogram of Face

In addition to the global generic histogram of all faces, the local individual histogram of each face is also considered to capture the variation of each face. This is illustrated by an exemplary diagram shown in FIG. 5. For each face, the basic face shape (52) model is used to find the probability inside the face bounding box (50) on the basis of an input image (51) in the same manner as in constructing the basic shape map (33) of FIG. 3, and this is followed by performing a weighted counting. However, storing all the individual histograms (54) may take a huge amount of memory if there are many faces in one frame, and the situation may become more severe if the histograms from multiple frames are stored. Therefore, to save memory, the individual histograms (54) of each face are preliminarily trimmed (53) while keeping as much pixel counts as possible. In what follows, an exemplary process of trimming is described more in detail.

Figures 5, 6:
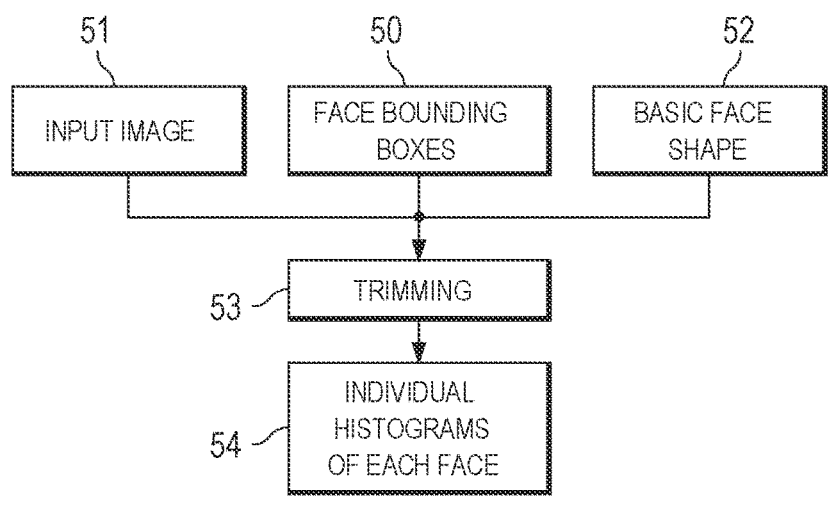
FIG. 5 shows an exemplary diagram of generating individual histograms of faces in an image according to an embodiment of the present disclosure.
FIG. 6 shows an exemplary diagram of calculating the initial probability of face according to an embodiment of the present disclosure.

With further reference to FIG. 5, for the k-th face, given the original histogram $hist_{face,k}$, the trimmed histogram $\widetilde{hist}_{face,k}$ is a subarray of size $$\tilde{N}_{bin}^Y \times \tilde{N}_{bin}^U \times \tilde{N}_{bin}^V$$

starting at bins $$(b_{start,k}^Y, b_{start,k}^U, b_{start,k}^V).$$

This is shown in the following equation:

$$\widetilde{hist}_{face,k} = hist_{face,k} \begin{pmatrix} b_{start,k}^Y : b_{start,k}^Y + \tilde{N}_{bin}^Y, b_{start,k}^U : b_{start,k}^U + \\ \tilde{N}_{bin}^U, b_{start,k}^V : b_{start,k}^V + \tilde{N}_{bin}^V \end{pmatrix} \quad (2)$$

In addition, the keeping ratio $r_{keep,k}$ of the trimmed histogram, i.e. the ratio of total pixel count before and after trimming, may be recorded for future use. Such ratio can be obtained as follows:

$$r_{keep,k} = \text{sum}(\widetilde{hist}_{face,k}) / \text{sum}(hist_{face,k}) \quad (3)$$

For an improved result, in order to trim the histogram, the contiguous bins of size $$\tilde{N}_{bin}^{Y} \times \tilde{N}_{bin}^{U} \times \tilde{N}_{bin}^{V}$$

inside which the summation of histogram is maximum may be found. However, the resulting computation may be large because the histogram is 3-D. Therefore, the histogram may be trimmed in one channel at a time in the order of Y, U and V channels. An example of parameters is $$\tilde{N}_{bin}^{Y} = 64, \tilde{N}_{bin}^{U} = \tilde{N}_{bin}^{V} = 16$$

for all faces. Moreover, most of the faces may have a keeping ratio of, for example, larger than 90%.

Continuing with the trimming process disclosed above, and in view of possible memory limitations, the maximum number of faces, $N_{face,max}$, may be set for storing individual histograms. As such, when $N_{face} > N_{face,max}$, the $N_{face,max}$ most important faces are only kept. Because larger faces in image usually attract more attention, the size of the bounding boxes may be used as a measure of importance. Additionally, the detection score of bounding boxes may be considered to avoid false detections. Therefore, the importance of each face may be defined based on their area and detection score as shown in the following equation:

$$a_k = c_k^2 * \min\left(\frac{w_k * h_k}{W * H / N_{face,max}}, 1\right) \tag{4}$$

where the area is normalized by $W*H/N_{face,max}$ and clipped to 1 because if a face is large enough, it is deemed as important. The term $N_{face,max}$ is put in the denominator because the more faces can be kept, the smaller faces can be considered. The top $N_{face,max}$ faces with the highest importance are selected. An exemplary value for $N_{face,max}$, is $N_{face,max}=16$.

With reference to FIG. 5 the following pseudocode shows an example of how the individual histograms (54) of each face using basic face shape (52) model of inscribed ellipse for YUV420 input is calculated:

```
// Calculate the individual histograms of each face using basic face shape model of
inscribed ellipse for YUV420 input
Input: YUV channels of input image S^Y, S_half^U and S_half^V, detected face bounding boxes
(c_k, x_k, y_k, w_k, h_k), k = 0, ... , N_face − 1, probability map of ROI M_ROI, scaling factors
f_box,x, f_box,y
Output: trimmed individual histograms hist~_face,k, starting bins by b_start,k^Y, b_start,k^U,
b_start,k^V, keeping ratio r_keep,k of each face, k = 0, ... , N_face − 1
for (k = 0; k < N_face; k + +) {
    // Initialize
    hist_face,k = zeros(N_bin^Y, N_bin^U, N_bin^V)
    hist~_face,k = zeros(Ñ_bin^Y, Ñ_bin^U, Ñ_bin^V)
    r_keep,k = 0
    // Skip invalid detection
    if (w_k == 0 or h_k == 0 or c_k == 0) {
        continue
    }
    // Center and half of the width and height of the rectangle to fit
    c_x = x_k + w_k/2
    c_y = y_k + h_k/2
    s_x = f_box,x * w_k/2
    s_y = f_box,y * h_k/2
    // Location and size of the rectangle to fit
    x_f = c_x − s_x
    y_f = c_y − s_y
    w_f = 2s_x
    h_f = 2s_y
    // Valid pixel range
    x_begin = max(round(x_f), 0)
    x_end = min(round (x_f + w_f), W)
    y_begin = max(round(y_f), 0)
    y_end = min(round(y_f + h_f), H)
    // Weighted count
    for (i = y_begin; i < y_end; i + +) {
        for (j = x_begin; j < x_end; j + +) {
            // Solid ellipse
            if ((i − c_y)²/(s_y)² + (j − c_x)²/(s_x)² < 1) {
                i_half = ⌊i/2⌋ // convert index for YUV420 input
                j_half = ⌊j/2⌋ // convert index for YUV420 input
                b^Y = ⌊S^Y (i, j)/w_bin^Y⌋
                b_half^U = ⌊S^U(i_half, j_half)/w_bin^U⌋
                b_half^V = ⌊S^V(i_half, j_half)/w_bin^V⌋
                hist_face,k(b^Y, b^U, b^V) = hist_face,k(b^Y, b^U, b^V) + c_k * M_ROI(i, j)
            }
        }
    }
    // Trim histogram
    hist~_face,k, b_start,k^Y, b_start,k^U, b_start,k^V, r_keep,k = trim_histogram(hist_face,k)
}
return hist~_face,k, b_start,k^Y, b_start,k^U, b_start,k^V, r_keep,k k = 0, ... , N_face − 1
Calculate the individual histogram of face using basic face shape model of arbitrary
``` shape for YUV420 input

Input: YUV channels of input image $S^Y$, $S_{half}^U$ and $S_{half}^V$, detected face bounding boxes $(c_k, x_k, y_k, w_k, h_k)$, k = 0, ..., $N_{face}$ – 1, probability map of ROI $M_{ROI}$, basic face shape model Q, scaling factors $f_{box,x}$, $f_{box,y}$ Output: trimmed individual histograms $\widetilde{hist}_{face,k}$, starting bins $b_{start,k}^Y$, $b_{start,k}^U$, $b_{start,k}^V$, keeping ratio $r_{keep,k}$ of each face, k = 0, ... , $N_{face}$ – 1

```
for (k = 0; k < N_face; k + +) {
    // Initialize
    hist_face,k = zeros(N_bin^Y, N_bin^U, N_bin^V)
    hist̃_face,k = zeros(Ñ_bin^Y, Ñ_bin^U, Ñ_bin^V)
    r_keep,k = 0
    // Skip invalid detection
    if (w_k == 0 or h_k == 0 or s_k == 0) {
        continue
    }
    // Center and half of the width and height of the rectangle to fit
    c_x = x_k + w_k/2
    s_x = f_box,x * w_k/2
    s_y = f_box,y * h_k/2
    // Location and size of the rectangle to fit
    x_f = c_x – s_x
    y_f = c_y – s_y
    w_f = 2s_x
    h_f = 2s_y
    // Valid pixel range
    x_begin = max(round(x_f), 0)
    x_end = min(round(x_f + w_f ), W)
    y_begin = max(round(y_f), 0)
    y_end = min(round (y_f + h_f), H)
    // Fill in basic face shape map
    for (i = y_begin; i < y_end; i + +) {
            i_half = ⌊i/2⌋ // convert index for YUV420 input
            j_half = ⌊j/2⌋ // convert index for YUV420 input
            b^Y = ⌊S^Y(i, j)/w_bin^Y⌋
            b^U = ⌊S_half^U(i_half, j_half)/w_bin^U⌋
            b^V = ⌊S_half^V(i_half, j_half)/w_bin^V⌋
            // Coordinate in basic face shape model
            i_m = clip3((i – y_f) * H_Q/h_f), 0, H_Q – 1)
            j_m = clip3((j – x_f) * W_Q/w_f), 0, W_Q – 1)
            hist_face,k(b^Y, b^U, b^V) = hist_face,k(b^Y, b^U, b^V) + c_k * Q(i_m, j_m) * M_ROI(i, j)
        }
    }
    // Trim histogram
    hist̃_face,k, b_start,k^Y, b_start,k^U, b_start,k^V, r_keep,k, = trim_histoggram(hist_face,k)
}
    return hist̃_face,k, b_start,k^Y, b_start,k^U, b_start,k^V, r_keep,k, k = 0, ... , N_face – 1
```

// Trim histogram

Input: histogram hist, number of bins in trimmed histogram $\tilde{N}_{bin}^Y$, $\tilde{N}_{bin}^U$, $\tilde{N}_{bin}^V$ Output: trimmed histogram $\widetilde{hist}$

```
// Trim Y channel
hist^Y = sum(hist, axis = [1,2]) // summation along U and V axes
b_start^Y = arg max sum ( hist^Y (b: b + Ñ_bin^Y))
r_keep^Y = sum (^b hist^Y (b_start^Y: b_start^Y + Ñ_bin^Y))/sum(hist^Y)
// Trim U channel
hist^U = sum(hist(b_start^Y: b_start^Y + Ñ_bin^Y,:,:), axis = [0,2]) // summation along Y
and V axes
b_start^U = arg max sum (hist^U (b: b + Ñ_bin^U))
r_keep^U = sum (^b hist^U(b_start^U: b_start^U + Ñ_bin^U))/sum(hist^U)
// Trim V channel
hist^V = sum(hist(b_start^Y: b_start^Y + Ñ_bin^Y, b_start^U: b_start^U + Ñ_bin^U,:), axis = [0,1]) //
summation along Y and U axes
b_start^V = arg max sum (hist^V(b: b + Ñ_bin^V))
r_keep^V = sum (^b hist^V (b_start^V: b_start^V + Ñ_bin^V))/sum(hist^V)
// Final output
hist̃ = hist(b_start^Y: b_start^Y + Ñ_bin^Y, b_start^U: b_start^U + Ñ_bin^U, b_start^V: b_start^V + Ñ_bin^V)
r_keep = r_keep^Y * r_keep^U * r_keep^V
return hist̃, b_start^Y, b_start^U, b_start^V, r_keep
```

13

A.2 Probability Adaptation

With the generated histograms as previously disclosed, the probability of face for each bin can be defined. Generally, if a color has higher value in a histogram of face, it is more likely to be part of the face. Therefore, the initial probability of face can be estimated directly from the generic histograms of face and all pixels. However, because the histogram of face is estimated from the basic shape map, which is just an initial guess of face region, further refining of the initial probability by adapting it to the histograms locally in YUV color space may be needed. As such, iterative adaptive sorting and probability propagation based on the individual histograms of each face and the generic histogram of non-face may be implemented. Details of initial probability estimation, adaptive sorting, and probability propagation are presented through the exemplary diagrams of FIGS. 6-8 which will be described in the following sections.

A.2.1 Initial Probability

FIG. 6 shows an exemplary diagram of calculating the initial probability of face according to an embodiment of the present disclosure. First, the ratio between the histogram of face (62) and generic histogram of all pixels (61) is calculated as follows:

$$r_{face} = \mathcal{G}_{\sigma_{hist}}(hist_{face}) \cdot / \mathcal{G}_{\sigma_{hist}}(hist_{all}) \tag{5}$$

where $\mathcal{G}_{\sigma_{hist}}$ is 3-D Gaussian filtering (63) with standard deviation $\sigma_{hist}$. Operator ./ is element-wise division (64). To avoid dividing by zero, $r_{face}(b)$ may be set to 0 for bin b where $\mathcal{G}_{\sigma_{hist}}(hist_{all})$ is 0. The purpose of Gaussian filtering is to reduce the noise in histogram. Standard deviation $\sigma_{hist}$ may be set to, for example, $\sigma_{hist}=0.25$ (in bin). Scaling and thresholding (65) is then applied on the ratio to get the initial probability of face (66). The larger the ratio, the larger the probability. For each bin b, the following applies:

$$p_{face,init}(b) = clip3((r_{face}(b) - r_0)/(r_1 - r_0), 0, 1) \tag{6}$$

where $r_0$ and $r_1$ are thresholds of ratio of histogram. From the above equation, it can be noticed that when $r_{face} < r_0$, $p_{face,init}=0$. On the other hand, when $r_{face} > r_1$, $p_{face,init}=1$. Thresholds $r_0$ and $r_1$ may be set, for example, to $r_0=0.1$ and $r_1=0.5$. Moreover, the histogram of non-face (68) may be defined as the difference (67) between the histograms $hist_{nonface}=hist_{all}-hist_{face}$. As will be seen later, histogram of non-face (68) will be used in the adaptive sorting process which will be detailed in the next section.

A.2.2 Adaptive Sorting

Figure 7:
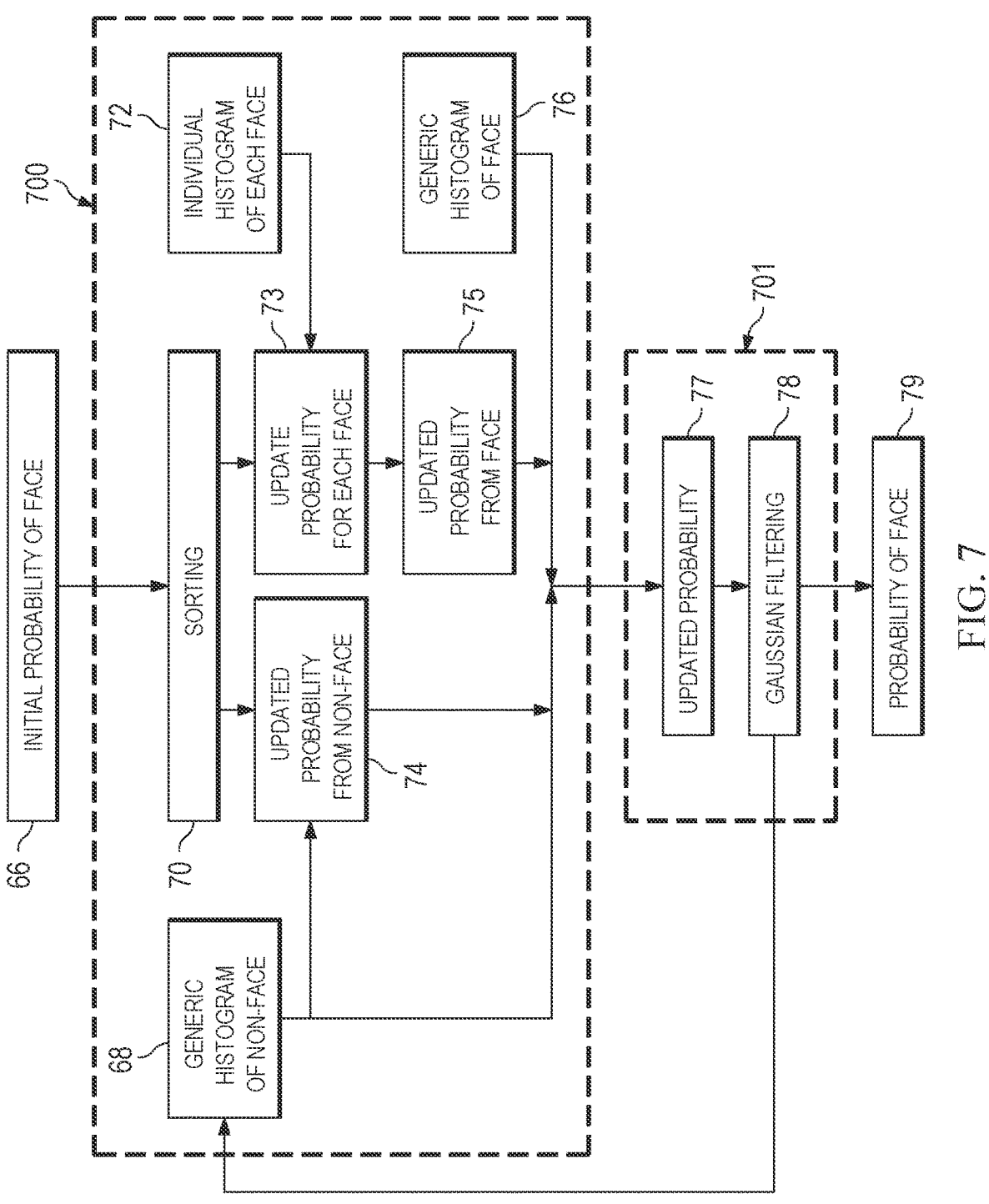
FIG. 7 shows an exemplary diagram of the adaptive sorting and probability propagation process according to an embodiment of the present disclosure.
Figure 8A:
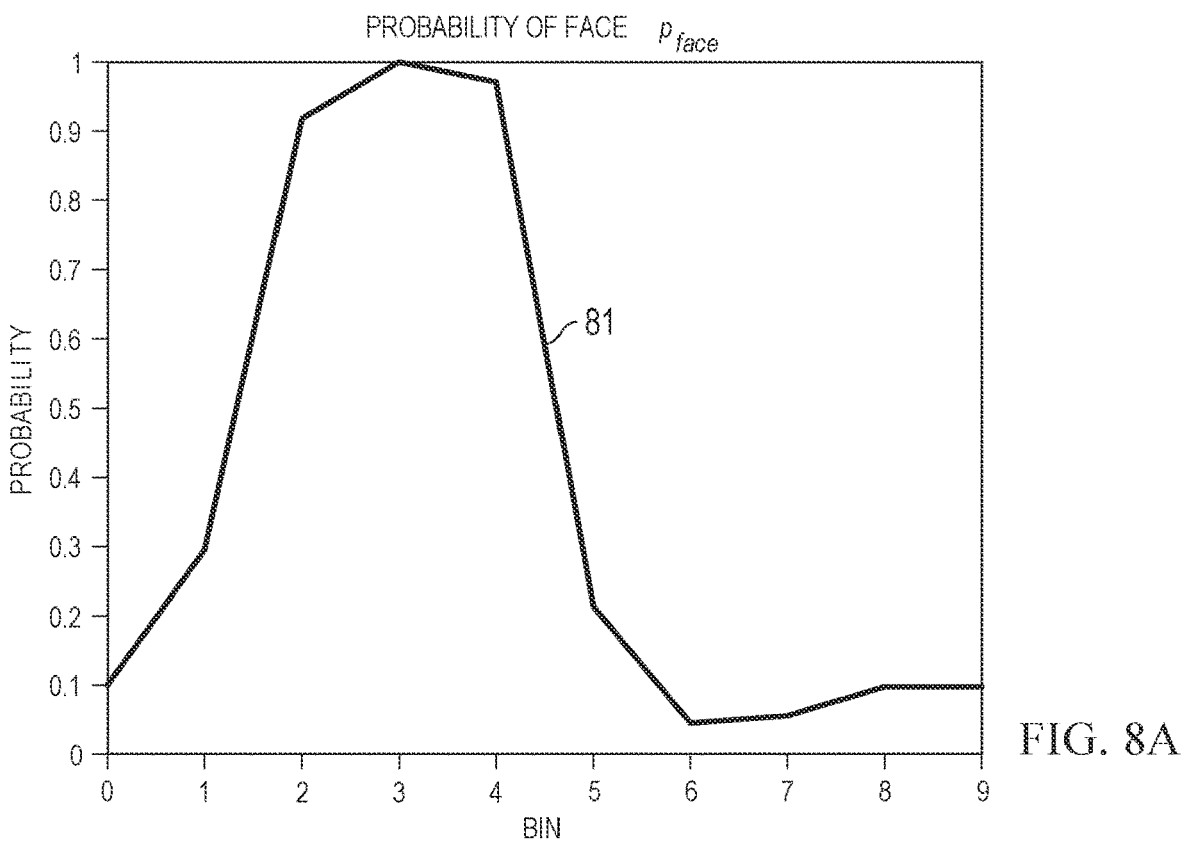
FIGS. 8A to 8D show example graphs and histograms related to the present disclosure.
Figure 8B:
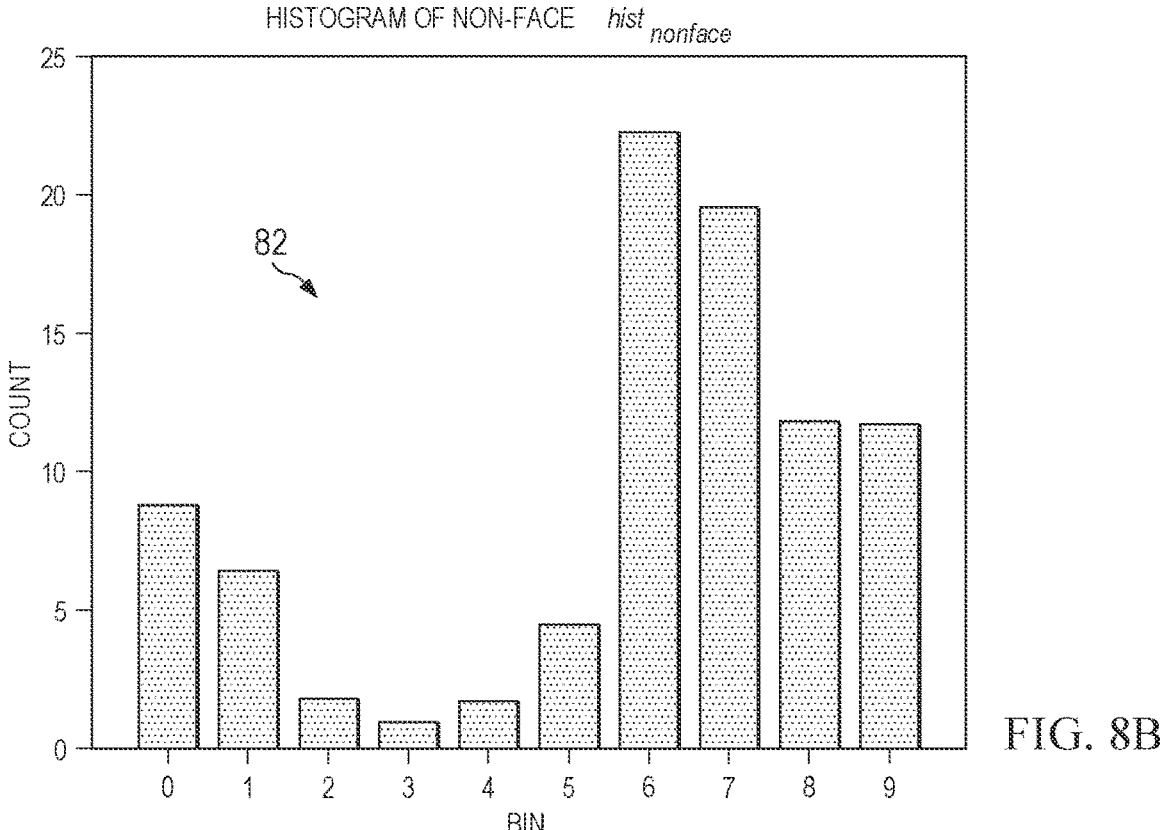
Figure 8C:
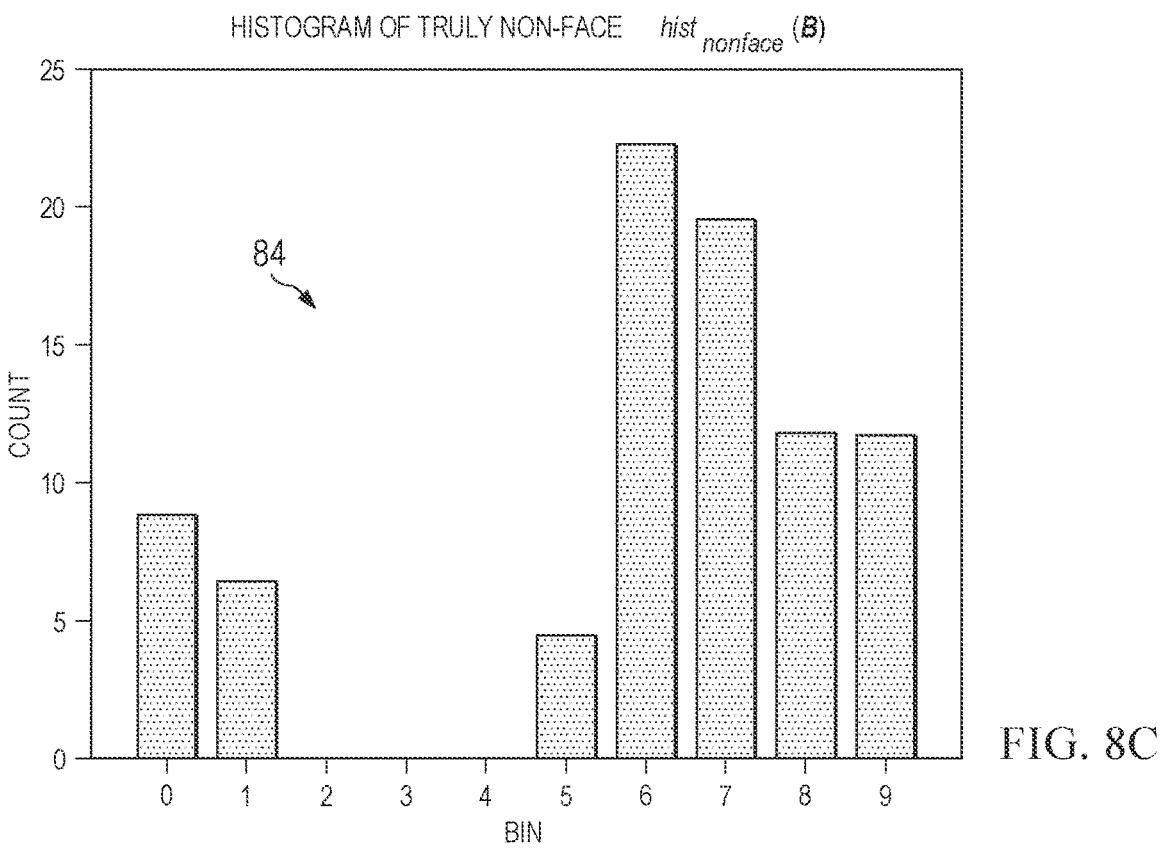
Figure 8D:
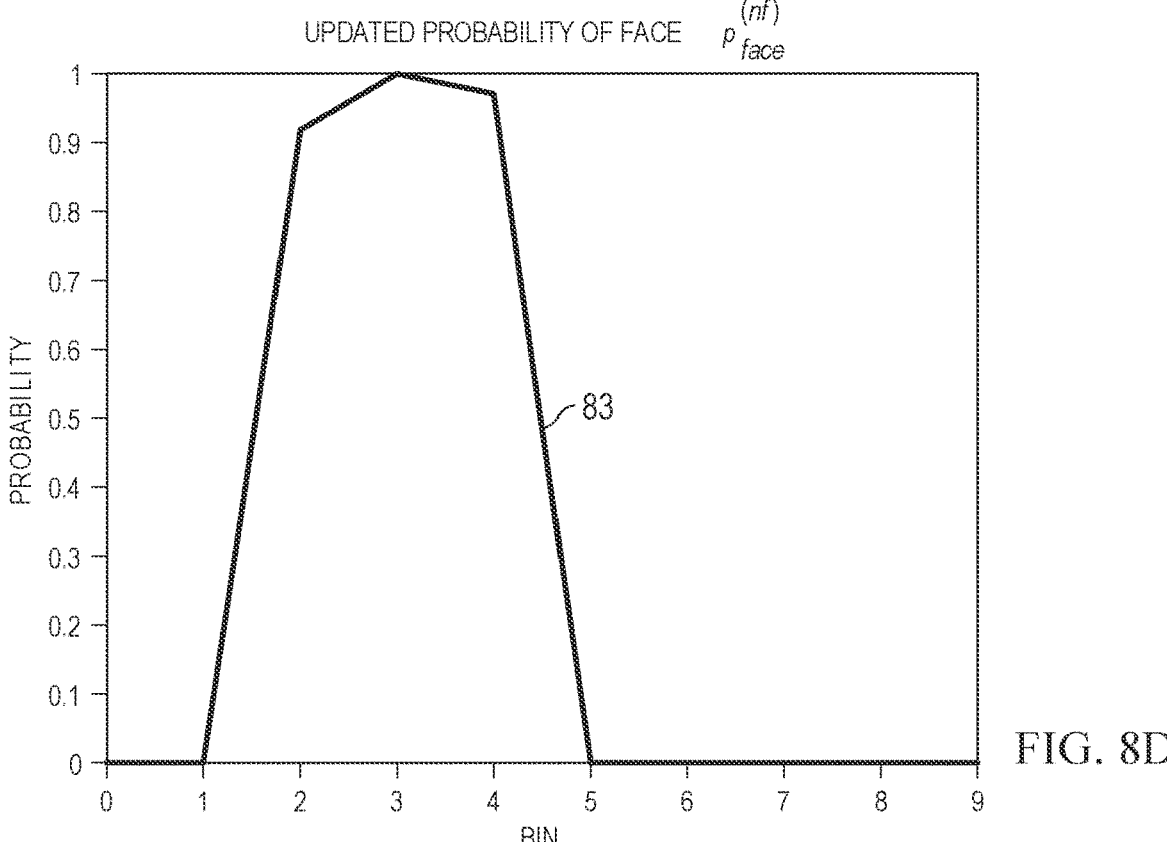

FIG. 7 shows an exemplary diagram of adaptive sorting (700), described in this section, and probability propagation (701) process, described in the next section. Most parts of the basic shape map (33) of FIG. 3 are assumed to be correct and only minor adjustment may be required. More specifically, it is assumed that at least $\theta_{nonface}$ portion of pixels counted in $hist_{nonface}$ are truly non-face. It is also assumed at least $\theta_{face}$ portion of pixels counted in $hist_{face,k}$ are truly face for each k. As such, the probability of face as the initial probability of face is first initialized, $p_{face} \leftarrow p_{face,init}$. Additionally, the probabilities of bins with the lowest probability are updated to 0 until the cumulative pixel count reaches

14

$\theta_{nonface}$ of the total pixel count of the histogram. In other words, the updated probability from non-face (74), $$p_{face}^{(nf)}$$

is obtained as follows:

$$p_{face}^{(nf)}(b) = \begin{cases} 0 & \text{if } b \in \mathcal{B}^{(nf)} \\ p_{face}(b) & \text{otherwise} \end{cases} \tag{7}$$

Where $\mathcal{B}^{(nf)}$ is the set of bins whose probabilities are to be updated to 0. In other words:

$$\mathcal{B}^{(nf)} = \arg\min_{\mathcal{B}}|\mathcal{B}| \tag{8}$$

s.t. $p_{face}(b) \leq p_{face}(b') \forall b \in \mathcal{B}$, $$b' \notin \mathcal{B} \text{ and } \sum_{b \in \mathcal{B}} hist_{nonface}(b) \geq \theta_{nonface} \sum_{b=0}^{N_{bin}^Y N_{bin}^U N_{bin}^V - 1} hist_{nonface}(b)$$

where $\mathcal{B}$ is the set of the bins with the lowest probability. The above-disclosed method is illustrated in FIGS. 8A-8D, and in the case of a 1-D histogram. Given probability of face (81), $p_{face}$, and histogram of non-face (82), $hist_{nonface}$, probability of the bins $\mathcal{B}$, with the lowest probability is updated until the sum of pixel count for those bins reach $\theta_{nonface}$ of total pixel count in histogram. As a result, histogram of truly non-face (84), $hist_{nonface}$, and updated probability from non-face (83), $$p_{face}^{(nf)},$$

are obtained.

Referring back to FIG. 7, similarly to what was disclosed with regards to updated probability from non-face (74), $$p_{face}^{(nf)},$$

the probabilities of bins with the highest probability are updated to 1 until the cumulative pixel count reaches $\theta_{face}$ of the total pixel count of the histogram for each face. In other words, the updated probability from each face (73) is obtained as:

$$p_{face,k}^{(f)}(b) = \begin{cases} 1 & \text{if } b \in \mathcal{B}_k^{(f)} \\ p_{face}(b) & \text{otherwise} \end{cases} \tag{9}$$

where $\mathcal{B}^{(f)}$ is the set of bins whose probabilities are to be updated to 1:

$$\mathcal{B}_k^{(f)} = \arg\min_{\mathcal{B}}|\mathcal{B}| \tag{10}$$

s.t. $p_{face}(b) \geq p_{face}(b') \forall b \in \mathcal{B}$, $$b' \notin \mathcal{B} \text{ and } \sum_{b \in \mathcal{B}} hist_{face,k<}(b) \geq \theta_{face} \sum_{b=0}^{N_{bin}^Y N_{bin}^U N_{bin}^V - 1} hist_{face,k}(b)$$

The updated probability from all faces (75) can be acquired by considering the updates from all faces:

$$p_{face}^{(f)}(b) = \max_k p_{face,k}^{(f)}(b) \qquad (11)$$

In practice, the trimmed histograms $\widetilde{hist}_{face,k}$, may only be available. In addition, in such trimmed histogrammed only $r_{keep,k}$ portion of pixel counts in $hist_{face,k}$ may be kept. Therefore, the cumulative pixel count may need to reach $\theta_{face}/r_{keep,k}$ of the sum of $\widetilde{hist}_{face,k}$ instead. Moreover, when $\theta_{face}/r_{keep,k} > 1$, all the probability of all bins in trimmed histogram are may be set to 1. The value for parameters $\theta_{nonface}$ and $\theta_{face}$ may be empirically decided. As an example, $\theta_{nonface} = 0.9$ and $\theta_{face} = 0.75$.

The pseudocode below shows an example of how the probability from non-face can be calculated:

---

Update the probability from non-face
Input: Initial probability of face $p_{face,init}$, histogram of non-face $hist_{nonface}$
Output: $p_{face}^{(nf)}$
// Initialize
$pf_{ace}^{(nf)} = p_{face,init}$
// Sort
$I_a = $ sort_index($p_{face}$, 'ascend') // get sort index in ascending order
// Cumulative sum
$C_{nonface} = $ zeros($N_{bin}^Y * N_{bin}^U * N_{bin}^V$)
$C_{nonface}$ (0) = $hist_{nonface}$ ($I_a$(0))
for (i = 1; i < $N_{bin}^Y * N_{bin}^U * N_{bin}^V$; i + +) {
    $C_{nonface}$(i) = $C_{nonface}$(i − 1) + $histn_{onface}$ ($I_a$(i))
}
// Update
for (i = 0; i < $N_{bin}^Y * N_{bin}^U * N_{bin}^V$; i + +) {
    $p_{face}^{(nf)}(I_a(i)) = 0$
    if ($C_{nonface}$ (i) ≥ $\theta_{nonface} * C_{nonface}$ ($N_{bin}^Y * N_{bin}^U * N_{bin}^V$)) {
        break
    }
}
return$p_{face}^{(nf)}$

---

The pseudocode below shows an example of how the probability from face can calculated

---

Update the probability from face
Input: Initial probability of face $p_{face,init}$, trimmed histograms $\widetilde{hist}_{face,k}$, starting bins $b_{start,k}^Y$, $b_{start,k}^U$, $b_{start,k}^V$, keeping ratio $r_{keep,k}$, k = 0, ... , $N_{face}$ − 1
Output: $p_{face}^{(f)}$
// Initialize
$p_{face}^{(f)} = p_{face,init}$
for (k = 0; k < $N_{face}$; k + +) {
    // Sort subarray
    $\tilde{p}_{face,k} = p_{face}(b_{start,k}^Y: b_{start,k}^Y, + \tilde{N}_{bin}^Y, b_{start,k}^U: b_{start,k}^U + \tilde{N}_{bin}^Y, b_{start,k}^V: b_{start,k}^V + \tilde{N}_{bin}^V)$
    $I_{dk} = $ sort_index($\tilde{p}_{face,k}$, 'descend') // get sort index in descending order
    // Cumulative sum
    $\tilde{C}_{face,k} = $ Zeros($\tilde{N}_{bin}^Y * \tilde{N}_{bin}^U * \tilde{N}_{bin}^V$)
    $\tilde{C}_{face,k}$ (0) = $\widetilde{hist}_{face,k}$ ($\tilde{I}_{d,k}$(0))
    for (i = 1; i < $\tilde{N}_{bin}^Y * \tilde{N}_{bin}^U * \tilde{N}_{bin}^V$; i + +) {
        $\tilde{C}_{face,k}$ (i) = $\tilde{C}_{face,k}$(i − 1) + $\widetilde{hist}_{face,k}$ ($\tilde{I}_{d,k}$(i))
    }
    // Update
    $I_{d,k} = $ untrim_index($\tilde{I}_{d,k}$) // convert index from subarray to complete array
    for (i = 0; i < $\tilde{N}_{bin}^Y * \tilde{N}_{bin}^U * \tilde{N}_{bin}^V$; i + +) {
        $p_{face}^{(f)}$ ($I_{d,k}$(i)) = 1

-continued

--- if ($\tilde{C}_{face,k}$(i) ≥ $\theta_{nonface} * \tilde{C}_{face,k}(N_{bin}^Y * N_{bin}^U * N_{bin}^V$)) {
            break
        }
    }
}
return $p_{face}^{(f)}$

---

A.2.3 Probability Propagation

With further reference to FIG. 7, because a bin may appear in both face and non-face regions, the updates from non-face and face are performed separately and summed together. Given the updated probability from non-face (74), $$p_{face}^{(nf)},$$

and the updated probability from face (75), $$p_{face}^{(f)},$$

the updated probability (77), $$p_{face}',$$

is the weighted sum of these two updated probabilities based on histogram counts, and as shown below:

$$p_{face}' = \frac{p_{face}^{(f)} * hist_{face} + p_{face}^{(nf)} * hist_{nonface}}{hist_{all}} \qquad (12)$$

To avoid division by zero, $p_{face}'$ may be set to 0 at the bins where $hist_{all}$ is 0. Moreover, because the probability is updated based on the sort index, it may undergo sharp changes between neighbor bins. As such, Gaussian filtering (78) may be performed in the 3-D bins to make the probability of face (79), $p_{face}$, smooth to avoid potential artifact in later stages of processing. The standard deviation of the gaussian filter, $\sigma_{prop}$, may be set, for example, to $\sigma_{prop} = 0.25$.

With continued reference to FIG. 7, in accordance with the teachings of the present disclosure, the adaptive sorting (700) and probability propagation (701) may be formed for $n_{probada}$ iterations to gradually adapt the probability to the histograms locally in YUV color space. The number of iterations $n_{probada}$, may be set, for example, to $n_{probada} = 3$.

A.3 Local Post-Processing

Figures 9, 10:
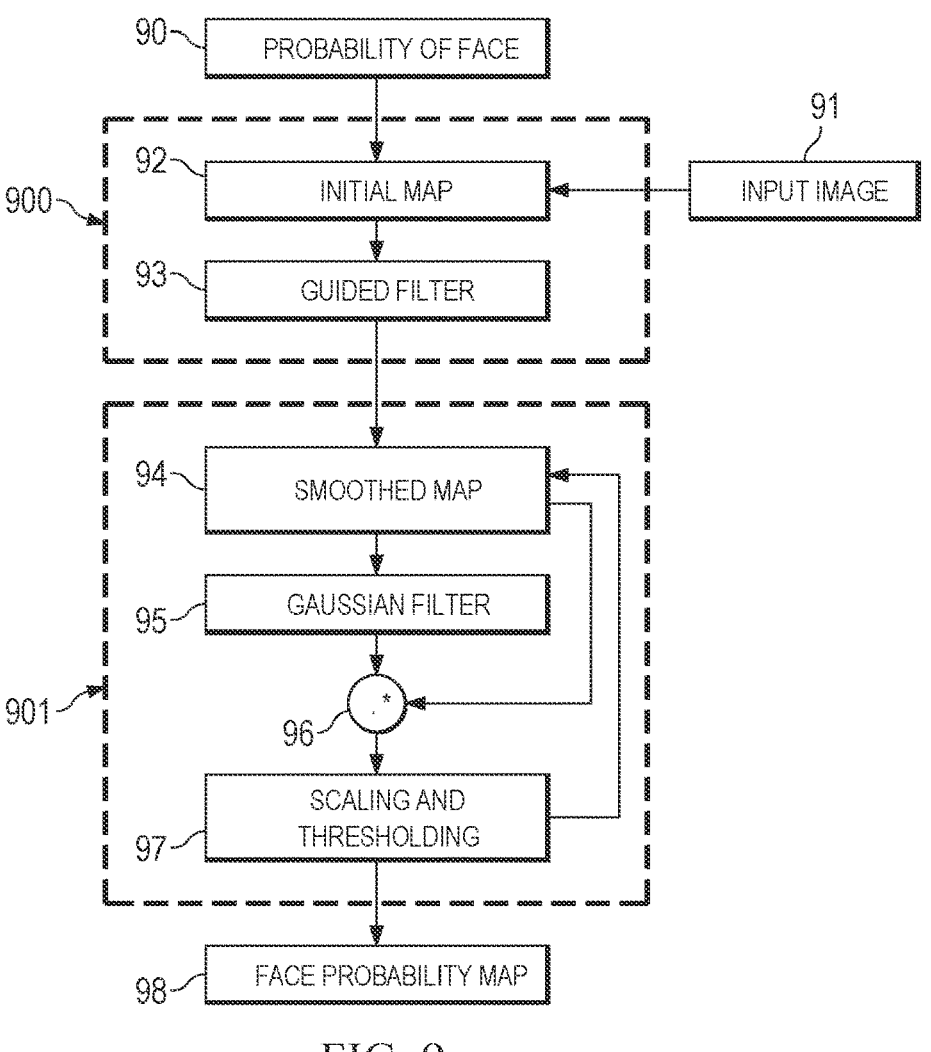
FIG. 9 shows an exemplary diagram illustrating the details of the local post processing step according to an embodiment of the present disclosure.
FIG. 10 shows an exemplary diagram of the local reshaping according to an embodiment of the present disclosure.

With reference to FIG. 7, the probability of face was refined in YUV color space, but the spatial relationships between pixels were not considered. According to embodiments of the present disclosure the probability of face can be further refined in the spatial domain. FIG. 9 is an exemplary diagram showing the details of local post processing step (240) as was disclosed with regards to the embodiment of FIG. 2. As shown, such post processing step comprises a local smoothing (900) to avoid visual artifact and a soft morphological operation (901) to remove small noise.

A.3.1 Local Smoothing

With further reference to FIG. 9, a combination of input image (91) and the probability of face (90), $p_{face}$, is first used to obtain the initial probability map (92) of face $M_{face,init}$. The following pseudocode is an example of how the probability map (92) for YUV420 input can be acquired:

```
Acquire probability map for YUV420 input
Input: YUV channels of input image $S^Y$, $S_{half}^U$ and $S_{half}^V$,
   probability of face $p_{face}$,
   probability map of ROI $M_{ROI}$
Output: probability map of face $M_{face,init}$
// Initialize
for (i = 0; i < H; i + +) {
   for (j = 0; j < W; j + +) {
       $M_{face,init}$(i, j) = 0
   }
}
// Find probability for all pixels
for (i = 0; i < H; i + +) {
   for (j = 0; j < W; j + +) {
       $i_{half} = \lfloor i/2 \rfloor$ // convert index for YUV420 input
       $j_{half} = \lfloor j/2 \rfloor$ // convert index for YUV420 input
       $b^Y = \lfloor S^Y(i, j)/w_{bin}^Y \rfloor$
       $b^U = \lfloor S_{half}^U(i_{half}, j_{half})/w_{bin}^U \rfloor$
       $b^V = \lfloor S_{half}^V(i_{half}, j_{half})/w_{bin}^V \rfloor$
       $M_{face,init}$(i,j) = $p_{face}(b^Y, b^U, b^V)$
   }
}
// Apply ROI
$Mf_{ace,init} \leftarrow M_{face,init} \cdot M_{ROI}$
return $M_{face,init}$
```

Referring back to FIG. 9, because the probability of face (90) is quantized into bins, if there are very few bins, the probability between bins may be interpolated for each pixel. However, because the probability of face (90) does not yet contain spatial information, there could be sharp changes between neighbor pixels in the initial probability map (92). If this occurs in the smooth region of input image (91), there will be false edges and banding-like artifact in the following local reshaping operation. To make the probability map smooth in the regions where the input image is smooth, guided image filtering (93), as described in [Ref. 1], incorporated herein by reference in its entirety, using the probability map (92) as the input and the normalized Y-channel of input image $\tilde{S}^Y$ as the guidance may be implemented. The implementation detail can be found, e.g., in the above-mentioned U.S. Prov. App. Ser. 63/086,699, incorporated herein by reference in its entirety. As a result of guided image filtering (93), a smooth map (94) is obtained. Exemplary parameter values that may be used for the guided image filter (93) are degree of smoothness 0.01 and kernel size 51 for the normalized input image (91) in the range of [0,1] and size 1920×1080. For images with different sizes, the kernel size may be scaled proportional to the image size:

$$M_{face} = M_{ROI} \cdot clip3\left(GIF\left(M_{face,init}, \tilde{S}^Y\right), 0, 1\right) \qquad (214)$$

The output of guided image filter (93) may be clipped between [0,1] because the guided image filter (93) is based on ridge regression and may create noise due to outliers. Also, the probability map of ROI may be applied so that the face region is inside ROI, i.e. $M_{face}(i) \leq M_{ROI}(i) \forall i$.

A.3.2 Soft Morphological Operation

Referring back to FIG. 9, as the face regions usually are continuous and have smooth boundaries, removing the small noises in the probability map (92) may be required. The small noise can be small holes or small unconnected dots in the probability map (92). Traditionally, the small noise can be removed through morphological operations such as closing and opening. However, such operations will also alter the boundary of face region, which is undesirable in some applications. In accordance with the teachings of the present disclosure, a soft morphological operation (901) can be used to remove such kind of small noise.

The soft morphological operation (901) of FIG. 9 essentially means weighting the importance of each pixel by its surroundings. Given the input probability map (92), $M_{face}$, the soft morphological operation (901) is defined as:

$$M_{\sigma_{morph},a_{morph}}(M_{face}) = clip3(a_{morph} * M_{face} \cdot * \mathcal{G}_{\sigma_{morph}}(M_{face}), 0, 1) \qquad (15)$$

Parameters to control the soft morphological operation (901) include $\sigma_{morph}$, the standard deviation for Gaussian filtering (95), and $a_{morph}$, the scaling factor to decide whether to expand the face region or not. Operator .* is elementwise multiplication. From the above definition, it can be seen that each pixel is multiplied by the weighted average of its surrounding pixels $\mathcal{G}_{\sigma_{morph}}(M_{face})$. As part of scaling and thresholding (97) step, for a pixel at which $M_{face} > 0$, if $\mathcal{G}_{\sigma_{morph}}(M_{face}) > 1/a_{morph}$, the pixel value will be amplified after the operation. On the other hand, if $\mathcal{G}_{\sigma_{morph}}(M_{face}) < 1/a_{morph}$, the pixel value will be decreased after the operation. In other words, the pixel is preserved only if its surroundings have high values. Additionally, the operation may be repeated for $n_{softmorph}$ iterations to gradually refine the probability map (92), as shown in the following:

$$M_{face} \leftarrow M_{ROI} \cdot * M_{\sigma_{morph},a_{morph}}^{n_{softmorph}}(M_{face}) \qquad (16)$$

where $M_{\sigma_{morph},a_{morph}}^{n_{softmorph}}(\bullet)$ means repeating $M_{\sigma_{morph},a_{morph}}(\bullet)$ for $n_{softmorph}$ times. Also, the probability map of ROI may be applied so that the face region is inside ROI, i.e. $M_{face}(i) \leq M_{ROI}(i) \forall i$. Parameters $\sigma_{morph}$, $a_{morph}$, and $n_{softmorph}$ may be set as, for example, $\sigma_{morph} = 25$, $a_{morph} = 3$ and $n_{softmorph} = 2$.

B. Local Reshaping with Face Adjustment

When local reshaping is performed, different reshaping functions can be applied on different pixels locally. The reshaping functions can control and enhance the image properties such as contrast, saturation, or other visual features, see e.g. the above-mentioned U.S. Prov. App. Ser. 63/086,699, incorporated herein by reference in its entirety. For most of the image contents, higher contrast and saturation bring better viewing experience to common people. However, for the face in images, higher contrast and saturation are not always better. People may not prefer the details, such as wrinkles or spots, on faces to be enhanced. Moreover, less saturated faces may be preferred compared with faces with over saturated skin color, which looks unnatural, i.e. changed skin tone. Local reshaping with face adjustment in accordance with the teachings of the present disclosure can be applied to address such problem. With reference to FIG. 9, after the face probability map (98) acquired based on what was disclosed previously, different reshaping functions can be applied to face regions from other non-face regions in images to adjust the contrast and saturation.

FIG. 10 shows an exemplary diagram of the local reshaping (110) according to an embodiment of the present disclosure. Based on the face probability map (102), the amount of contrast adjustment (103) for each pixel in the input image (101) is decided. In addition, the amount of saturation adjustment (104) for each pixel in the input image (101) is also decided. The adjustments for contrast and saturation are then applied to reshaping function (105) selection. The reshaping operation (106) is performed based on the selected reshaping function (105) to generate a reshaped image (107). In what follows, details of the elements of local reshaping (110) will be described.

B.1. Local Reshaping Function Selection

With further reference to FIG. 10, local reshaping method (110) may be based on local reshaping function selection as detailed in the above-mentioned U.S. Prov. App. Ser. 63/086,699, incorporated herein by reference in its entirety. In other words, for each pixel, an individual reshaping function (105) selected from a family of reshaping functions is applied for the reshaping operation (106) for each channel. Denote the input image S and its YUV channel $S^Y$, $S^U$ and $S^V$, the reshaped image V and its YUV channel $V^Y$, $V^U$ and $V^V$, for the i-th pixel, the local reshaping operation can be defined as:

$$v_i^Y = B_{L_i^Y}^Y(s_i^Y) \tag{17}$$

$$v_i^U = MMR_{L_i^U}^U(s_i^Y, s_i^U, s_i^V) \tag{18}$$

$$v_i^V = MMR_{L_i^V}^V(s_i^Y, s_i^U, s_i^V) \tag{19}$$

where $$s_i^Y, s_i^U, s_i^V, v_i^Y, v_i^U, \text{ and } v_i^V$$

are the i-th pixel in $S^Y$, $S^U$, $S^V$, $V^Y$, $V^U$ and $V^V$, respectively. B, $MMR^U$, and $MMR^V$ are the family of reshaping functions for Y, U, and V channels, respectively, and $$L_i^Y, L_i^U, \text{ and } L_i^V$$

are the corresponding indices of the selected reshaping functions for the i-th pixel. For simplicity, the indices for all pixels are denoted as index maps $L^Y$, $L^U$ and $L^V$. Therefore, given an input image and corresponding index maps, the local reshaping operation for each pixel can be performed accordingly.

With carefully designed families of reshaping functions, the brightness, contrast, saturation, or other visual features in the reshaped images can be changed by adjusting the index maps. For example, as described, e.g. in the above-mentioned U.S. Prov. App. Ser. 63/086,699 incorporated herein by reference in its entirety, the local detail and contrast enhancement can be achieved by using:

$$L^Y = L^U = L^V = L^{(g)} + f^{SL}\left(\alpha. * \left(\tilde{s}^Y - \tilde{s}^{Y,(l)}\right)\right) \tag{20}$$

Or equivalently $$L^Y = L^U = L^V = L^{(g)} + f^{SL}(\Delta L^{(l)}) \text{ and} \tag{21}$$

$$\Delta L^{(l)} = \alpha. * \left(\tilde{s}^Y - \tilde{s}^{Y,(l)}\right)$$

where $$\tilde{s}^Y$$

is the Y channel of normalized input image in the range of, for example, [0,1] and $$\tilde{s}^{Y,(l)}$$

is the corresponding edge-preserving filtered image. $\alpha$ is the map of enhancement strength for each pixel. The larger the $\alpha$, the stronger the enhancement. $f^{SL}(\cdot)$ is a pixelwise non-linear function to further adjust the enhancement based on pixel brightness. $L^{(g)}$ is a constant global index for the whole image, which control the overall look, such as brightness and saturation, of the reshaped images. Moreover, when $\alpha=0$, all the pixels use the same reshaping function and this is called global reshaping, which means no local contrast and detail enhancement. As an example, 4096 reshaping functions in the family of reshaping functions can be considered for each channel. The parameter used may be a the default setting such as $\alpha=3.8*c_1$ for all pixels, where $c_1$, is the model parameter and can be set as, for example, $c_1=2687.1$.

With continued reference to FIG. 10, and in view of what was disclosed above, given the face probability map (102), by adjusting the indices in the face region in the index maps, change the look of the faces in the reshaped images (107) can be changed. In the following sections, the face contrast adjustment (103) and saturation adjustment (104) will be described more in detail.

B.2 Face Contrast Adjustment

In some applications the enhancement the details, such as wrinkles or spots, on faces like other image contents may not be desired. As such, there may be a need to reduce the enhancement strength in face region when performing detail and contrast enhancement. The adjusted index map $L^Y$ may be defined as:

$$L^Y = L^{(g)} + f^{SL}\left(\Delta L^{(l)} + \Delta L_{face,c}\right) \text{ where} \tag{22}$$

$$\Delta L_{face,c} = -r_{face} * M_{face} * \alpha. * \left(\tilde{s}^Y - \tilde{s}^{Y,(l)}\right)$$

where $r_{face}$ is the face contrast reduction ratio. It can be seen that for pixel i, if $M_{face}(i)=1$, $\Delta L_{face,c}(i)$ becomes $-r_{face}(i)$ $*\alpha(i)*(\tilde{s}^Y(i)-\tilde{s}^{Y,(l)}(i))$ and the term $\Delta L^{(l)}(i)+\Delta L_{face,c}(i)$ in Equation (22) can be written as $(1-r_{face}(i)*\alpha(i)*(\tilde{s}^Y(i)-\tilde{s}^{Y,(l)}(i))$. By comparing with Equation (20) and (21), the enhancement strength drops from $\alpha$ (i) to $(1-r_{face})*\alpha(i)$. Therefore, $\Delta L_{face,c}$ reduces the contrast on faces for $0<r_{face}\leq1$. When $r_{face}=0$, there is no adjustment. When $r_{face}=1$, the enhancement strength on face becomes 0. Empirically, if the enhancement strength on a face is 0, the face may look over-smoothed compared to the surrounding image contents, which are enhanced in the original strength. As an example, $r_{face}$ may be set as $r_{face}=0.5$.

B.2 Face Saturation Adjustment

In general, increasing the color saturation in images improves the viewing experiences. However, when it comes to the faces in images, increasing the color saturation in the same way as other image contents may be undesired. Over saturated skin color will make the faces looks unnatural or unhealthy. With reference to FIG. 10, the disclosed face saturation adjustment (104) addresses such problem.

As described in U.S. Prov. App. Ser. 63/086,699 incorporated herein by reference in its entirety, in general, the smaller the index of a reshaping function, the less saturated the reshaped image. In addition, the darker the input pixel, the more sensitive the reshaped pixel to the index.

In view of the above, based on the acquired $L^Y$ as disclosed in the previous section, the adjusted index maps $L^U$ and $L^Y$ can be further defined as:

$$L^U = L^V = L^Y + \Delta L_{face,s} \text{ where} \tag{23}$$

$$\Delta L_{face,s} = -d_{face} * M_{face} * \left( \min(\hat{S}^Y / \theta_{sat}, 1) \right)$$

in Equation (23) $d_{face}$ is the face desaturation offset. $\theta_{sat}$ is the threshold to control the desaturation. Therefore, $\Delta L_{face,s}$ reduces the saturation on face when $d_{face} > 0$ and $\theta_{sat} > 0$. The larger the $d_{face}$, the more the desaturation. When $d_{face} = 0$, there is no desaturation. Empirically, parameters $d_{face}$ and $\theta_{sat}$ may be set as, for example, $d_{face} = 1024$ and $\theta_{sat} = 0.5$.

A number of embodiments of the disclosure have been described. Nevertheless, it will be understood that various modifications may be made without departing from the spirit and scope of the present disclosure. Accordingly, the invention may be embodied in any of the forms described herein, including, but not limited to the following Enumerated Example Embodiments (EEEs) which described structure, features, and functionality of some portions of the present invention:

EEE1: A method of face region detection in an input image including one or more faces, the method comprising: providing face bounding boxes and confidence levels for each face of the one or more faces; based on the input image, generating a histogram of all pixels; based on the input image and the face bounding boxes, generating histograms of the one or more faces; based on the histogram of all pixels and the histograms of the one more face, generating a probability of face, and based on the probability of face, generating a face probability map.

EEE2: The method of EEE1, wherein the generating the histograms of the one or more faces comprises, based on a combination of face bounding boxes with a basic face shape, generating a basic face shape map, and based on the input image and the basic face shape map, generating the histograms of the one or more faces.

EEE3: The method of any of EEEs 1 and 2, wherein the generating of the probability of face comprises: filtering the histogram of all pixels to generate a filtered histogram of all pixels, and filtering the histograms of the one or more faces to generated filtered histograms of the one or more faces.

EEE4: The method of EEE3, further wherein the generating of the probability of face further comprises, scaling and thresholding a combination of the filtered histogram of all pixels and filtered histograms of the one or more faces to generate an initial probability of face.

EEE5: The method of EEE4, wherein the initial probability of face comprises an initial probability of face in YUV channel.

EEE6: The method of any of EEEs 4 and 5, wherein the generating of the probability of face further comprises subtracting the generated histograms of the one or more faces from the generated histogram of all pixels to generate a histogram of non-face.

EEE7: The method of EEE6, wherein generating of the probability of face further comprises, based on the initial probability of face and the histogram of non-face, generating an updated probability of non-face, and based on the initial probability of face and the histograms of the one or more faces, generating an updated probability of face.

EEE8: The method of EEE7, generating of the probability of face further comprises combining the updated probability from non-face and the updated probability from face to generate an updated probability, and filtering the updated probability to generate the probability of face.

EEE9: The method of EEE8, wherein the filtering is performed using a gaussian filter.

EEE10: The method of any of EEEs 1-9, further comprising, after generating the probability of face and before generating the face probability map, local smoothing the probability of face to generate a smoothened probability of face, and applying a soft morphological operation to the smoothened probability of face to generate the face probability map.

EEE11: The method of EEE8, further comprising, after generating the probability of face and before generating the face probability map, local smoothing the probability of face to generate a smoothened probability of face, and applying a soft morphological operation to the smoothened probability of face to generate the face probability map.

EEE12: The method of any of EEEs 10 and 11 further comprising applying local reshaping by: applying face saturation adjustment and face contrast adjustment to the face probability map to generate an adjusted face probability map; and generating a reshaped image based on the adjusted face probability map and one or more selected reshaping function.

EEE13: The method of any of EEEs 1-12, further comprising trimming the histograms of the one or more faces to reduce a memory space required to store the histograms of the one or more faces.

EEE14: The method of any of EEEs 3-9, wherein: the filtering the histogram of all pixels is performed using a gaussian filter, and the filtering the histograms of the one or more faces is performed using a gaussian filter.

EEE15: The method of any of EEEs 4-9 wherein the combination of the filtered histogram of all pixels and filtered histograms of the one or more faces comprises a ratio of the filtered histograms of the one or more faces with the filtered histogram of all pixels.

EEE16: The method of EEE8, wherein the combining the updated probability from non-face and the updated probability from face comprises generating a weighted sum of updated probability from non-face and the updated probability from face.

EEE17: The method of EEE12, wherein the applying the face contrast adjustment is performed by adjusting a contrast of the one or more faces based on a face contrast reduction ratio.

EEE18: The method of EEE12, wherein the applying the face saturation adjustment is performed by adjusting a saturation of the one or more faces based a face desaturation offset and a face desaturation threshold.

EEE19: A video decoder comprising hardware, software, or both configured to carry out the method of any one of EEEs 1-18.

EEE20: A non-transient computer readable medium containing program instructions for causing a computer to perform the method of any of EEEs 1-18.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

REFERENCES

[1] He, Kaiming, Jian Sun, and Xiaoou Tang. "Guided image filtering." IEEE Transactions on Pattern Analysis and Machine Intelligence 35, no. 6 (2012): 1397-1409.

The invention claimed is:

1. A method of performing local reshaping on an input image including one or more faces, the method comprising: generating a histogram of all pixels in the input image; based on a combination of face bounding boxes for the one or more faces with a basic face shape model, generating a basic face shape map comprising a pixel mapping of basic face shapes for the one or more faces; based on the input image and the basic face shape map, generating histograms of the one or more faces; based on the histograms of the one more faces, generating for each bin of the histogram of all pixels a probability of face comprising a probability of a pixel being in a face, based on the probability of face, generating a face probability map comprising a pixel mapping of the input image to the probabilities of each pixel individually being part of a face, and generating a reshaped image from the input image based on the face probability map and one or more selected reshaping functions, wherein after generating the probability of face and before generating the face probability map, local smoothing the probability of face to generate a smoothened probability of face, and applying a soft morphological operation to the smoothened probability of face to generate the face probability map.

2. The method of claim 1, wherein the basic face shape model comprises an inscribed ellipse of a bounding box.

3. The method of any of claim 1, wherein the generating of the probability of face comprises:
   filtering the histogram of all pixels to generate a filtered histogram of all pixels, and
   filtering the histograms of the one or more faces to generated filtered histograms of the one or more faces.

4. The method of claim 3, further wherein the generating of the probability of face further comprises:
   scaling and thresholding a combination of the filtered histogram of all pixels and filtered histograms of the one or more faces to generate an initial probability of face.

5. The method of claim 4, wherein the initial probability of face comprises an initial probability of face in YUV channel.

6. The method of claim 3, wherein:
   the filtering the histogram of all pixels is performed using a gaussian filter, and
   the filtering the histograms of the one or more faces is performed using a gaussian filter.

7. The method of claim 4, wherein the combination of the filtered histogram of all pixels and filtered histograms of the one or more faces comprises a ratio of the filtered histograms of the one or more faces with the filtered histogram of all pixels.

8. The method of claim 4, wherein the generating of the probability of face further comprises:
   subtracting the generated histograms of the one or more faces from the generated histogram of all pixels to generate a histogram of non-face.

9. The method of claim 8, wherein generating of the probability of face further comprises:
   based on the initial probability of face and the histogram of non-face, generating an updated probability of non-face, and
   based on the initial probability of face and the histograms of the one or more faces, generating an updated probability of face.

10. The method of claim 9, generating of the probability of face further comprises:
   combining the updated probability from non-face and the updated probability from face to generate an updated probability, and
   filtering the updated probability to generate the probability of face.

11. The method of claim 10, wherein the filtering is performed using a gaussian filter.

12. The method of claim 10, further comprising:

after generating the probability of face and before generating the face probability map, local smoothing the probability of face to generate a smoothened probability of face, and applying a soft morphological operation to the smoothened probability of face to generate the face probability map.

13. The method of claim 10, wherein the combining the updated probability from non-face and the updated probability from face comprises:

generating a weighted sum of updated probability from non-face and the updated probability from face.

14. The method of claim 1 further comprising:

applying local reshaping by:

applying face saturation adjustment and face contrast adjustment to the face probability map to generate an adjusted face probability map; and generating a reshaped image based on the adjusted face probability map and one or more selected reshaping function.

15. The method of claim 14, wherein the applying the face contrast adjustment is performed by adjusting a contrast of the one or more faces based on a face contrast reduction ratio.

16. The method of claim 14, wherein the applying the face saturation adjustment is performed by adjusting a saturation of the one or more faces based a face desaturation offset and a face desaturation threshold.

17. The method of claim 1, further comprising:

trimming the histograms of the one or more faces to reduce a memory space required to store the histograms of the one or more faces.

18. A video decoder comprising hardware, software, or both configured to carry out the method of claim 1.

19. A non-transitory computer-readable storage medium having stored thereon computer-executable instruction for executing a method with one or more processors in accordance with claim 1.

* * * * *